US010115003B2

(12) United States Patent
Georgescu et al.

(10) Patent No.: US 10,115,003 B2
(45) Date of Patent: Oct. 30, 2018

(54) IMAGE PROCESSING APPARATUS

(71) Applicant: FotoNation Limited, Galway (IE)

(72) Inventors: Vlad Georgescu, Brasov (RO); Mihai Constantin Munteanu, Brasov (RO); Petronel Bigioi, Galway (IE); Corneliu Zaharia, Brasov (RO); Szabolcs Fulop, Brasov (RO); Gyorgy Simon, Brasov (RO)

(73) Assignee: FotoNation Limited, Galway (IE)

( * ) Notice: Subject to any disclaimer, the term of this patent is extended or adjusted under 35 U.S.C. 154(b) by 36 days.

(21) Appl. No.: 15/247,748

(22) Filed: Aug. 25, 2016

(65) Prior Publication Data

US 2017/0061639 A1 Mar. 2, 2017

Related U.S. Application Data

(60) Provisional application No. 62/210,243, filed on Aug. 26, 2015.

(30) Foreign Application Priority Data

May 13, 2016 (WO) ................ PCT/EP2016/060827

(51) Int. Cl.
*G06K 9/00* (2006.01)
*G06T 3/60* (2006.01)
(Continued)

(52) U.S. Cl.
CPC ............ *G06K 9/00228* (2013.01); *G06T 3/60* (2013.01); *G06T 7/11* (2017.01); *G06T 7/73* (2017.01); *G06T 2207/10004* (2013.01)

(58) Field of Classification Search
CPC ......... G06K 9/00228; G06T 7/11; G06T 7/73; G06T 3/60
See application file for complete search history.

(56) References Cited

U.S. PATENT DOCUMENTS 5,912,676 A 6/1999 Malladi et al.
7,800,628 B2 9/2010 Harville et al.
(Continued)

FOREIGN PATENT DOCUMENTS

EP 0978802 A2 * 2/2000 ............ G06T 3/606
WO 2008/014472 A2 1/2008
(Continued)

OTHER PUBLICATIONS

Szeliski et al. "High-Quality Multi-Pass Image Resampling" Microsoft Technical Report MSR-TR-2010-10, Feb. 2010.*
(Continued)

*Primary Examiner* — Wesley J Tucker

(57) ABSTRACT

An image processing apparatus comprises a normalisation module operatively connected across a bus to a memory storing an image in which a region of interest (ROI) has been identified within the image. The ROI is bound by a rectangle having a non-orthogonal orientation within the image. In one embodiment, the normalisation module is arranged to divide the ROI into one or more slices, each slice comprising a plurality of adjacent rectangular tiles. For each slice, the apparatus successively reads ROI information for each tile from the memory including: reading a portion of the image extending across at least a width of the slice line-by-line along an extent of a slice. For each tile, the apparatus downsamples the ROI information to a buffer to within a scale $S_D<2$ of a required scale for a normalised version of the ROI. The apparatus then fractionally downsamples and rotates downsampled information for a tile within the buffer to produce a respective normalised portion of the ROI at the required scale for the normalised ROI. Downsampled and rotated information is accumulated for each tile within a normalised ROI buffer for subsequent processing by the image processing apparatus.

22 Claims, 6 Drawing Sheets

(51) Int. Cl.
*G06T 7/73* (2017.01)
*G06T 7/11* (2017.01)

(56) References Cited

U.S. PATENT DOCUMENTS

| | | |
|---|---|---|
| 9,167,143 B2 | 10/2015 | Ollila et al. |
| 9,258,473 B2 | 2/2016 | Azuma |
| 9,313,390 B2 | 4/2016 | Velarde et al. |
| 2012/0162524 A1* | 6/2012 | Bar-Shalom .............. G06T 3/60 348/583 |
| 2015/0110351 A1* | 4/2015 | Csefalvay .......... G06K 9/00234 382/103 |
| 2015/0147003 A1* | 5/2015 | He ............................. G06T 3/60 382/296 |
| 2017/0017831 A1* | 1/2017 | Rollend ............. G06K 9/00228 |
| 2017/0243330 A1* | 8/2017 | Stec ........................ G06T 5/003 |

FOREIGN PATENT DOCUMENTS

| | | | |
|---|---|---|---|
| WO | 2010/051147 A2 | 5/2010 | |
| WO | 2014/005783 A1 | 1/2014 | |
| WO | WO-2014005783 A1 * | 1/2014 | ............. G06T 5/006 |
| WO | 2016/000874 A1 | 1/2016 | |
| WO | WO-2017032468 A1 * | 3/2017 | ......... G06K 9/00228 |

OTHER PUBLICATIONS

Szeliski, Winder, and Uyttendaele, "High-quality multi-pass image resampling", MSR-TR-2010-10, Microsoft Technical Report, Feb. 2010.

International Search Report for International Application No. PCT/EP2013/061611, completed Sep. 4, 2013 and dated Sep. 16, 2013, 3 pages.

International Search Report for International Application No. PCT/EP2015/061919, completed Jul. 24, 2015 and dated Dec. 2, 2015, 4 pages.

* cited by examiner

IMAGE PROCESSING APPARATUS

FIELD OF THE INVENTION

The present invention relates to an image processing apparatus, in particular, an apparatus arranged to re-sample a region of interest (ROI) of an image to provide a normalised image portion suitable for further processing.

BACKGROUND

WO2014/005783 (Ref: FN-384-PCT) discloses a method for correcting a distorted input image comprising determining a local region of an image to be displayed and dividing the region into an array of rectangular tiles, each tile corresponding to a distorted tile with a non-rectangular boundary within the input image. For each tile of the local region, maximum and minimum memory address locations of successive rows of the input image sufficient to span the boundary of the distorted tile are determined. Successive rows of the distorted input from between the maximum and minimum addresses are read. Distortion of the non-rectangular portion of said distorted input image is corrected to provide a tile of a corrected output image which is stored.

Once a distorted input image has been corrected, if such distortion correction is required, object detection such as face detection can be performed to identify one or more regions of interest (ROI) within the image which can be of use for subsequent or further image processing. For example, exposure levels or focus distance for subsequent image acquisition can be based on a detected object or objects.

Note that depending on the type of object detection, tracking and/or classification being employed, any ROI detected within a (corrected) image can bound objects in a number of different orientations and having a number of different sizes.

Apart from for example, adjusting exposure or focus, it is also possible to perform further processing on any detected ROI. For example, when a ROI including a face is detected, it can be desirable to perform face recognition in order to identify an imaged individual.

Before performing such further processing, it can be useful to provide a normalised version of the ROI so that each normalised ROI submitted for further processing is in an orthogonal orientation and is of a given size (or one of a limited number of sizes). This, for example, allows classifiers or further processing modules operating on the normalised version of the ROI to be more readily implemented in hardware and so provides improved further processing.

In order to do so, the ROI needs to be re-sampled to produce the normalised version of the ROI.

Richard Szeliski, Simon Winder, and Matt Uyttendaele, "High-quality multi-pass image resampling", MSR-TR-2010-10, Microsoft Technical Report, February 2010 discloses a family of multi-pass image resampling algorithms that use one-dimensional filtering stages to achieve high-quality results at low computational cost. Frequency-domain analysis is performed to ensure that very little aliasing occurs at each stage in the multi-pass transform and to insert additional stages where necessary to ensure this. Using one-dimensional resampling enables the use of small resampling kernels, thus producing highly efficient algorithms.

It is an object of the present invention to provide an improved technique for normalising a ROI from within an image.

SUMMARY

In a first aspect, there is provided an image processing apparatus according to claim 1.

In a second aspect, there is provided an image processing apparatus according to claim 12.

In the present specification, the term normalised is used for a version of a region of interest (ROI) which has an orthogonal orientation, so that it can occupy a regular rectangular portion of memory of a given size (or one of a limited number of given sizes). It can also be useful for the content within the ROI to have a given orientation so that if, for example, an object within a ROI has been detected at an orientation significantly off vertical, such as flipped upside down or sideways, a normalised version would always store the detected object in a vertical orientation.

BRIEF DESCRIPTION OF THE DRAWINGS

Embodiments of the present invention will now be described, by way of example, with reference to the accompanying drawings, in which.

DESCRIPTION OF THE EMBODIMENTS

Figure 1:
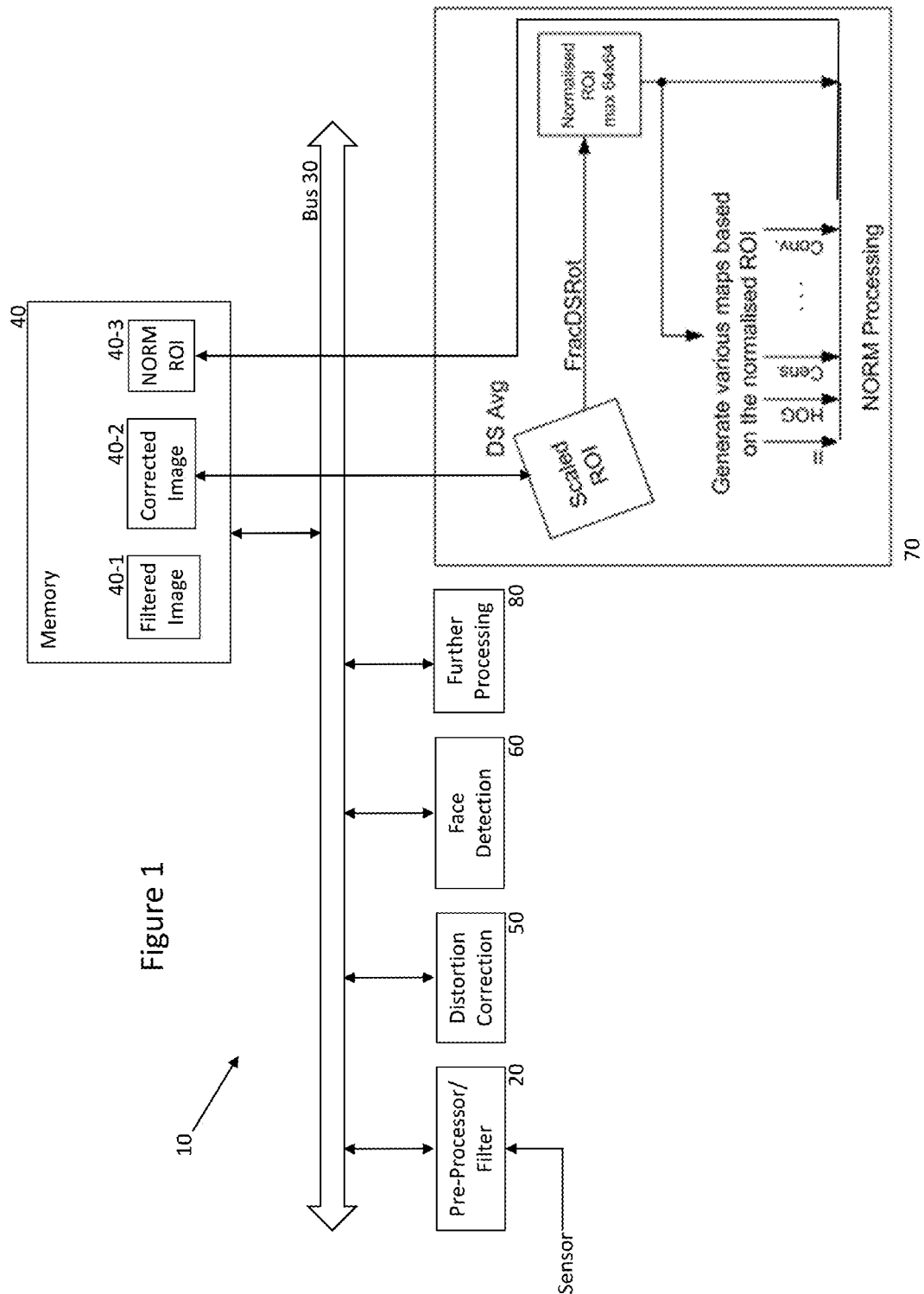
FIG. 1 illustrates an image processing apparatus according to an embodiment of the present invention.

Referring now to FIG. 1, there is shown an image processing apparatus 10 according to an embodiment of the present invention. As in the case of WO2014/005783 (Ref: FN-384-PCT), a pre-processing/filter module 20 receives an image from a sensor and writes a filtered image 40-1 across a system bus 30 to memory 40.

A distortion correction module 50 such as the module disclosed in WO2014/005783 (Ref: FN-384-PCT) can now correct the filtered image 40-1 for distortion, if required, to provide a distortion corrected version 40-2 of the filtered image 40-1 in memory 40.

In this embodiment, objects of interest are faces and a face detection and tracking module 60, again as disclosed in WO2014/005783 (Ref: FN-384-PCT) is used to identify any regions of interest (ROI) within the distortion corrected image 40-2 which might bound a face. Meta data indicating the location of any such ROI within the image 40-2 can either be stored with the image or in any other suitable portion of memory 40 where the data can be retrieved by other image processing modules.

Depending on the variety of face detection classifiers and/or form of tracking used by the face detection and tracking module 60, the module 60 may identify faces in a number of different orientations within the distortion corrected image 40-2. It will also be appreciated that depending on the variety of sizes of classifier used to identify the faces, the size of the ROI bounding the detected faces can vary significantly.

In embodiments of the present invention, a normalising module 70, identifies any ROI within a corrected image 40-2 and re-samples the ROI to provide a normalised version (NORM ROI) 40-3 of the ROI in memory 40. This normalised version 40-3 can then be used by subsequent further processing modules such as the module 80 for performing processing such as face recognition. It will be appreciated that this further processing can either be performed either by dedicated processing modules or the CPU (not shown) for the image processing device including the architecture shown in FIG. 1. Such devices can include digital stills cameras, digital video cameras, smartphones, tablet computers or any camera enabled computer.

It will also be appreciated that once the normalised version 40-3 of a ROI has been calculated, the normalising module 70 can also perform further processing on the normalised version 40-3 to provide information commonly used by further processing modules 80 as will be described in more detail below.

Figure 2:
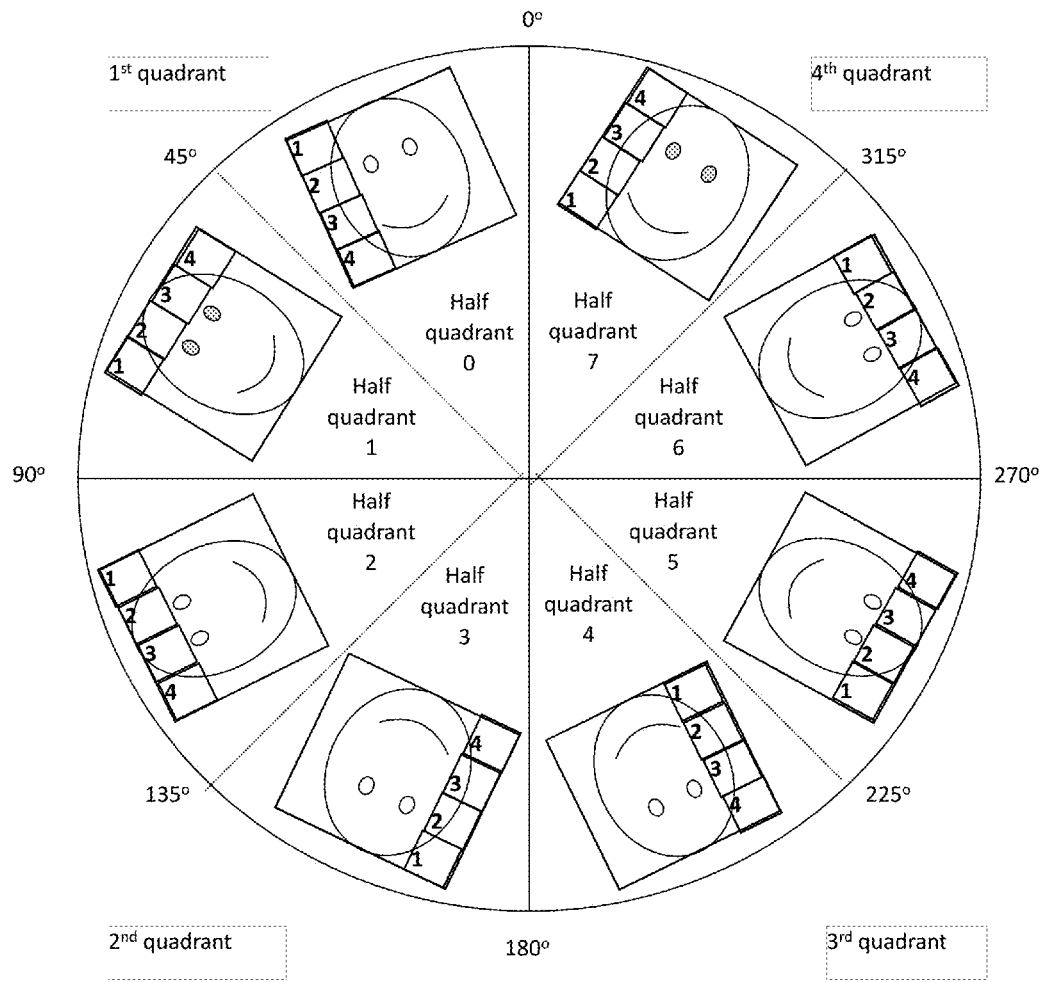
FIG. 2 illustrates: a number of different possible orientations of a detected ROI within an image, each orientation corresponding to objects from a half-quadrant range of orientations; as well as the order in which tiles from within each ROI are read in a first embodiment of the normalising module (NORM) illustrated in in FIG. 1.

Referring to FIG. 2, in a first embodiment of the present invention, the normalizing module 70 reads a ROI from an image 40-2 in memory 40 in tiles. Note that pixel information for a ROI is typically stored in words within memory 40 and so obtaining information for a given pixel can required that at least one word be read from memory 40 across the bus 30 by a module such as the normalizing module 70.

The number of tiles read depends on the size of the ROI and can vary from 1 to 64. In the example shown, the ROI comprises 16 tiles divided into 4 slices running either from top-to-bottom or bottom-to-top within the ROI, each slice comprising 4 tiles, with each tile extending across a low multiple of 8×8 pixels of the image 40-2. In FIG. 1, only 1 slice comprising tiles 1-4 is shown for each potential orientation of ROI. Slices containing tiles 5-8; 9-12; and 13-16 run parallel and in the same direction as the slice comprising tiles 1-4. Dividing the ROI in this fashion reduces the bandwidth and gate count required for the normalization module 70 to read a ROI from memory 40 and to process the ROI.

As mentioned above, the face detection module 60 typically operates a number of different classifiers. Although not illustrated in FIG. 2, up to 4 classifiers can be used to identify faces oriented at or close to each of the cardinal angles: 0, 90, 180, 270° respectively. ROI produced by such classifiers are straightforward to down-sample and to normalise including, if required, possibly flipping their content horizontally and/or vertically so that not alone can the normalised version of the ROI occupy a given size of memory, but its contents can be stored in a consistent orientation even if, for example, an image has been acquired with a camera in a landscape, portrait or inverted state or with a subject in a sideways or inverted state.

For any ROI at one of the cardinal angles of 0, 90, 180, 270°, the start address for each tile is the corner address of the tile; and in this case, as the information for each of the 16 tiles is read from memory 40, it can be down-sampled and possibly flipped into 8×8 blocks which when aggregated within the normalising module 70 provide a normalised square ROI of 32×32 pixels. If a larger normalised ROI were required possibly because a very large ROI had been detected by the module 60, then up to 64 tiles could be down-sampled and possibly flipped, each into 8×8 blocks which would be aggregated to provide a normalised square ROI of 64×64 pixels. Of course, the size of the normalised ROI and the number of tiles employed could be increased further if required. Note that for ROI at the cardinal angles, tiles could theoretically be read in any order as, in general, the only pixels required for processing any given tile can come from within the boundary of a tile. However, for convenience, tiles for such ROI are read in sequence slice by slice for a ROI.

In the example of FIG. 2, a further 8 classifiers can identify faces at non-orthogonal angles between 0 and 360°. In order to do so, the complete range is divided into 8 half-quadrants labelled 0-7, each spanning an orientation sub-range of 45° with respective classifiers being employed by the face detection module 60 to detect faces within these orientation sub-ranges. Thus the classifier employed for half-quadrant 0 would be expected to detect faces at orientations ranging between 0 and 45° i.e. the detected face need not necessarily align perfectly with the classifier as illustrated in FIG. 2. Note that for any given acquired image, the face detection module 60 might only employ a subset of these 12 cardinal direction and non-cardinal direction classifiers, depending for example on the orientation of the image acquisition device or the orientation of faces detected in previously acquired images in a sequence. Indeed the face detection module 60 might only apply detection in certain portions of the image (such as portions containing skin or eyes) or, if other pre-filtering conditions are not met, face detection might not be performed at all on a given image.

The order in which slices and tiles for a ROI produced by non-cardinal direction classifiers are read from each slice is dependent on the orientation of the ROI. It will be noted from FIG. 2 that, within any quadrant, the tile processing direction (top-to-bottom or bottom-to-top) is reversed for each half-quadrant. It will also be noted that for half-quadrants 3-6, slices are read from right to left from within the ROI; whereas for half-quadrants 7, 0, 1 and 2, slices are read from left to right from within the ROI.

For ROI detected by the non-cardinal classifiers illustrated in FIG. 2, the ROI not only needs to be down-sampled, but also rotated so that the normalised ROI can occupy a rectangular portion of memory. It will be appreciated that if a rectangular block bounding each tile were read from the image 40-2, then such rectangular blocks for adjacent tiles would overlap significantly, so increasing the bandwidth required for the normalising module 70 to read an ROI from memory 40.

Thus, embodiments of the normalizing module 70 attempt both to minimize gate count for the module 70 by serially processing smaller tile portions of a ROI, but also minimize bandwidth requirements, by avoiding duplicative reading of information from memory 40.

Figures 3, 4:
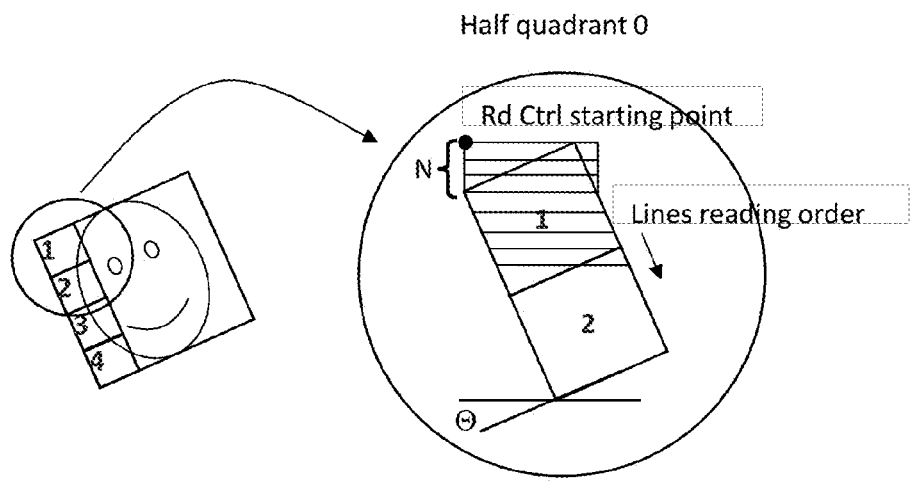
FIGS. 3 and 4 show the order of processing tiles for half-quadrants 0 and 1 respectively in FIG. 2 in the first embodiment of the normalising module (NORM) of FIG. 1.

Referring now to FIGS. 3 and 4, the order for reading tiles from half quadrants 0 and 1 are shown. For reading ROI at such non-cardinal angles, the normalising module 70 starts from an address located outside the ROI-Rd Ctrl starting point.

For even numbered half-quadrants 0, 2, 4 and 6, slices are read line-by-line from top-to-bottom as shown in FIG. 3; and for odd numbered half-quadrants 1, 3, 5, and 7, slices are read from bottom-to-top as shown in FIG. 4.

The lines of any slice are always read from the memory starting from the leftmost edge of the first tile in the slice. Thereafter, pixels for each tile are read line by line, until the data for the last line of the last tile in a slice is reached. (Using the leftmost point of a tile and either the top (for even half-quadrants) or bottom (for even odd-quadrants) point of a tile as a start address avoids the need to calculate a start address trigonometrically by extrapolation.)

The process then repeats in the same fashion for each slice in a ROI with the addresses being read shifted by the width of a slice.

As illustrated in FIGS. 3 and 4, starting from this leftmost edge of tile 1 and from a line corresponding to either the top or the bottom of the tile according to the half-quadrant, the module 70 reads line portions of the ROI from memory 40. In FIGS. 3 and 4, Rd Ctrl starting point is shown as coinciding with the leftmost edge of the tile, but it will be appreciated that in practice, this address will correspond with the address of a memory word beginning immediately to the left of the leftmost edge of the tile. The width of the line portion read from memory needs to be sufficiently wide to pick up all tile data from a ROI within memory 40 and so extends by the number of memory words plus 1 required to store a tile width of $W_{TILE}$ pixels rotated at an angle ($\Theta=22.5°$) in the ROI i.e. the number of words plus 1 required to store $W_{TILE}/\text{Cos}(\Theta)$ pixels. As will be seen from FIGS. 3 and 4, the width of each line portion read for a slice is constant along the slice and so the start address for each line advances the read start address along the length of a slice to ensure the line portion read from memory picks up the required tile data. As will be seen from FIGS. 3, 4 and 5, for the first tile in a slice, in this case tile 1, this advance is non-linear in that the read start address is the same until the process reaches the line containing the leftmost point of the tile and thereafter the read start address advances as required to ensure all tile data falls within the line portion read. For subsequent tiles, the advance is linear along the length of the tile. (In FIGS. 3, 4 and 5, this is shown simply in straight line form, but it will be appreciated that the advance is in practice step wise.)

Because in this embodiment, the rotation angle $\Theta$ of the potential ROI generated by the classifiers illustrated in FIG. 2, and so the orientation of the tiles, is the same for any given quadrant, the line offset N at which the read start address begins to shift is always the same and so this can be hardcoded rather than being calculated trigonometrically— in any case the calculation is the same for each quadrant.

Figure 5:
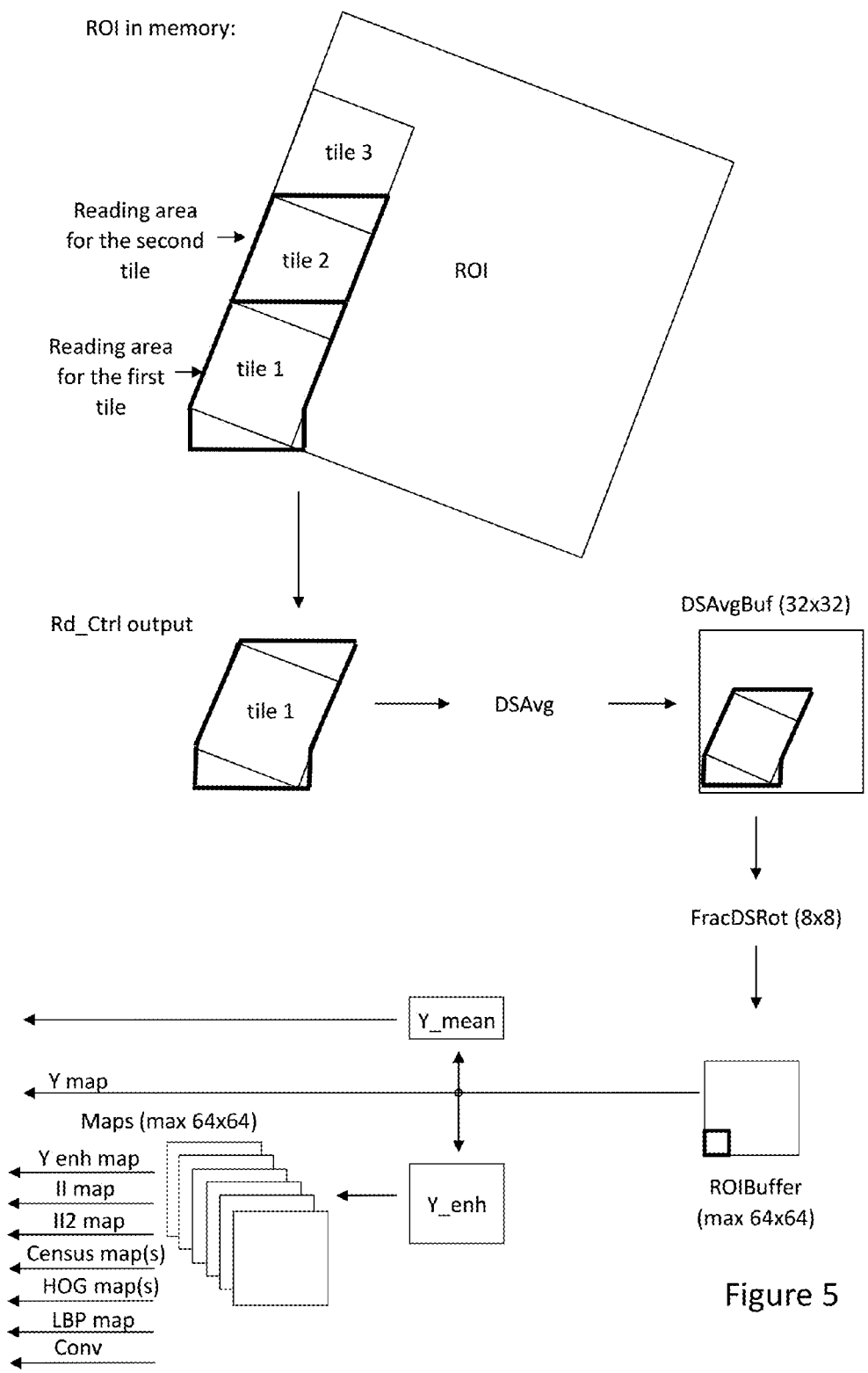
FIG. 5 illustrates in more detail the processing performed according to the first embodiment of the normalising module (NORM) of FIG. 1.

Once the normalisation module 70 has read the line portions it requires for a tile, these are processed as illustrated in more detail in FIG. 5.

Each input tile is down-sampled and rotated in 2 steps: integer or nearest-neighbor down-sample (DSAvg) followed by fractional bilinear or nearest neighbor down-sample with a maximum scale of 1.99 with rotation (FracDSRot).

Thus, DSAvg downsamples a tile portion as it is read from memory 40 to within a scale $S_D$ twice the required size for the tile information within the normalized ROI. DSAvg writes its downsampled information to a rolling buffer DSAvgBuf which in the illustrated example, for convenience has a total size of 32×32 pixels. The integer or nearest-neighbor down-sampled tiles produced by the DSAvg step can be stored into 4 interleaved memories within DSAvgBuf, so that during processing by FracDSRot, 4 pixels can be read in each clock cycle and interpolated to produce a single pixel of the normalized ROI.

Of course DSAvgBuf could be arranged differently if FracDSRot employed other interpolation schemes such as bicubic interpolation.

FracDSRot then maps downsampled information for each tile to an 8×8 pixel output which is written to a buffer ROIBuffer having a total size of 64×64 pixels (thus in the present example, only a quarter of this buffer will be filled for a given ROI).

The location within the ROIBuffer of the normalized information for a tile depends on the quadrant being read and whether the ROI information is being flipped or not during normalization.

Once processing of the first tile in a slice is complete, line portions for subsequent tiles are read from memory 40 beginning from the line following the last line of the first tile and downsampled into DSAvgBuf so that no duplicative reading of memory is required for reading tiles within a given slice; and indeed the only additional information read from memory is the non-tile area within the first N lines of the first tile and last N lines of the last tile of a slice. This overhead could be reduced further but with increased complexity resulting from not reading the same number of words per line for a complete slice.

Processing continues until a slice is complete i.e. when the line containing the top or bottom of a slice is read from memory. DSAvgBuf can then be flushed, reset or overwritten and the process repeated for each slice until the ROI is complete and all of the tiles for a ROI have been written to the buffer ROIBuffer.

It will be appreciated that the information within these tiles can be flipped horizontally and/or vertically during either the DSAvg and/or FracDSRot stages so that the content of the ROI buffer corresponds to an object in a given orientation regardless of the orientation of the object within the originally captured image. Alternatively, this could be done once the ROIBuffer has been completed.

Note that even taking in account the non-regular arrangement of the downsampled tile information within DSAvgBuf, it would be possible to reduce the size of DSAvgBuf to less than 32×32 pixels, but this saving is not critical.

In any case, in the present example, ROIBuffer will typically contain at least intensity and possibly color information for a normalized ROI. For example, for a YCC format image, ROIBuffer could comprise Y plane information only. As indicated above, the normalizing module 70 can generate supplementary information based on the normalized ROI. For example, a Y_mean value for the ROI can be provided. In addition, the normalization module 70, can generate a number of maps based on the information in ROI Buffer. For example, Y_enh map can comprise a histogram equalised and/or contrast enhanced version of the ROI buffer information. The Y enhanced map of the normalised ROI can in turn be used to provide other maps including:

An Integral Image (II) and $II^2$ map
Census map
LBP (linear binary pattern)
HOG (Histogram of Gradients) or
A Convolution of maps generated from a plurality of normalised ROI generated from respective images comprising similar content.

All of this information illustrated in FIG. 1 as NORM ROI 40-3 can then be made available for further processing of the normalized ROI image by further processing modules 80.

Figure 6:
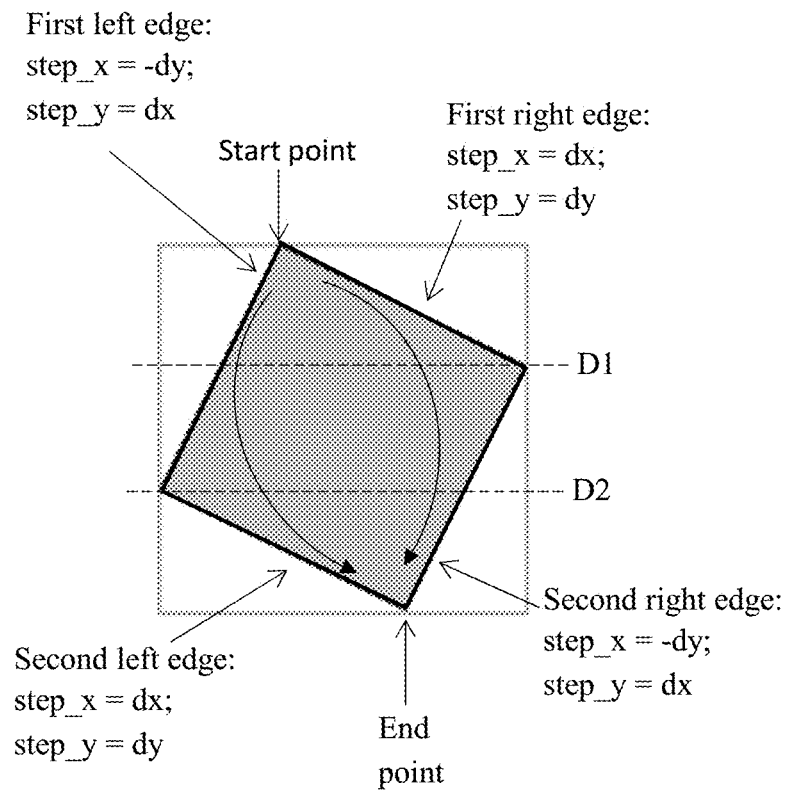
FIG. 6 shows edge pixel computation for a second embodiment of the normalising module (NORM) illustrated in FIG. 1.
Figure 7:
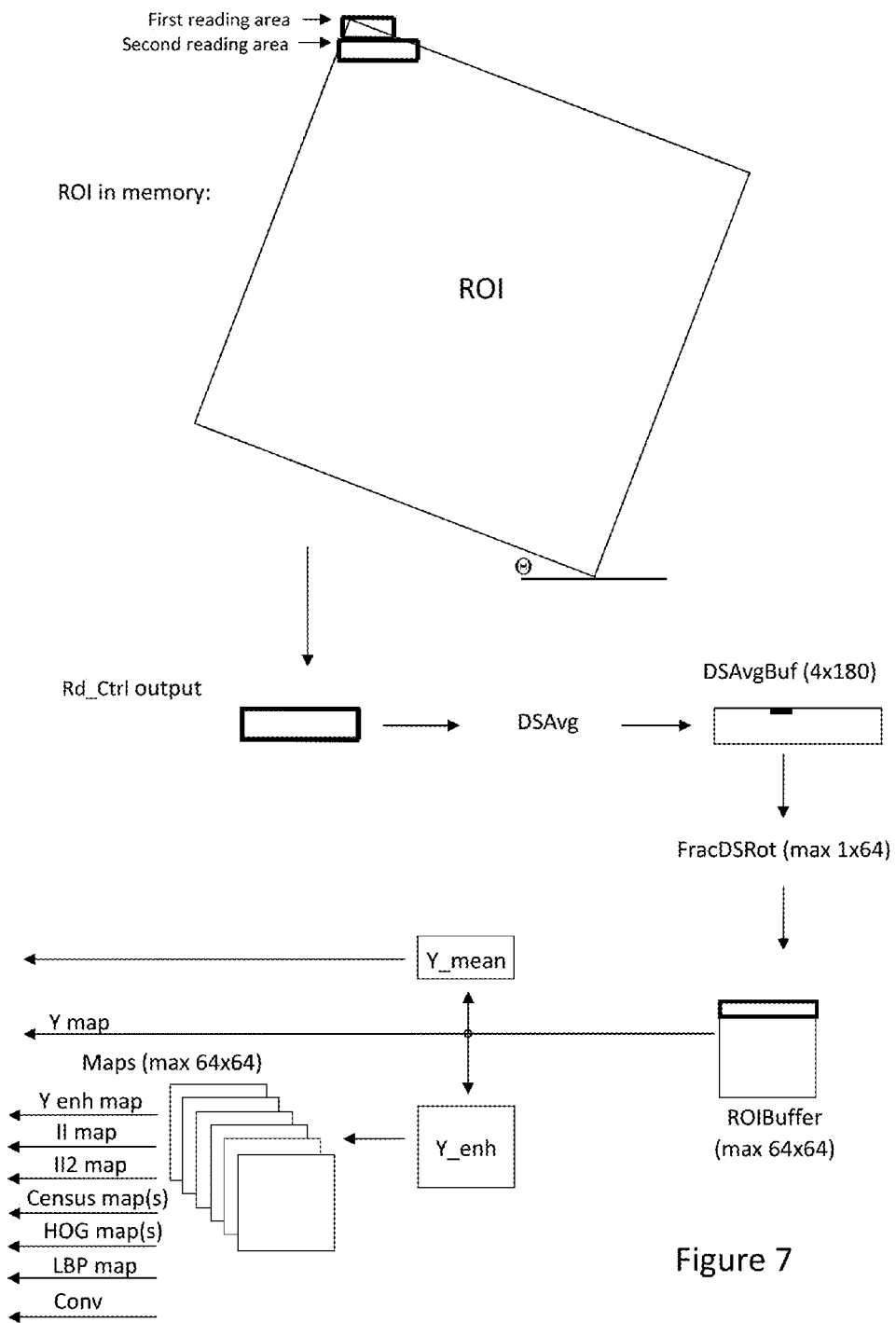
FIG. 7 illustrates in more detail the processing performed according to the second embodiment of the normalising module (NORM) illustrated in FIG. 1.

Referring now to FIGS. 6 and 7, in a second embodiment of the present invention, rather than dividing a region of interest into tiles, the ROI is read as a single tile, line by line by the normalizing module 70 from memory 40 to produce a normalized ROI 40-3.

The start (Min X) and end (Max X) read address for each line are calculated according to the orientation of the ROI and for each line of the ROI extend from the memory word address immediately before the pixel on the left edge of the ROI and finish with the memory address extending past the pixel on the right edge of the ROI.

Referring to FIG. 6, it will be seen that for a rectangular ROI, beginning at a first pixel location (Start Point), the change in the edge pixel addresses from one line to the next (step_x, step_y) in both the x and y directions changes as reading advances past the corners of the ROI. So from the lines between the start point and line D1, the step advance from one right edge pixel to the next right edge pixel step_x=dx, step_y=dy; whereas the step advance from one left edge pixel to the next left edge pixel step_x=−dy, step_y=dx. At line D1, these switch for the right edge so that for the right edge pixels step_x=−dy, step_y=dx. Then at line D2, the values for the left edge pixels change to step_x=dx, step_y=dy until the end point. Now, knowing the pixel location at the left edge and right edge of the ROI for any given line, Min X and Max X memory addresses can be determined and read.

Again, as the input tile is read from memory 40, it is down-sampled and rotated in 2 steps: integer or nearest-neighbor down-sample (DSAvg) followed by fractional bilinear or nearest neighbor down-sample with a maximum scale of 1.99 with rotation (FracDSRot).

In this case, however, the DSAvg output is stored in a buffer DSAvgBuf with a capacity of 4×180 pixels. Once 4 lines of information have been accumulated in the buffer, FracDSRot will have sufficient information to produce a 1×64 pixel line of the ROIBuffer. The process is then repeated every 4 lines of the ROI with the buffer DSAvgBuf being overwritten each time. It will be appreciated that if the rotation angle Θ of the ROI were smaller, fewer rows would be required for the buffer DSAvgBuf whereas a greater rotation angle Θ could require more lines within the buffer DSAvgBuf.

Again, flipping horizontally and/or vertically of the ROI information to ensure the object within the ROIBuffer has a given orientation can be performed by either DSAvg and/or FracDSRot; or this could be done once the ROIBuffer has been completed. Again, DSAvgBuf can comprise 4 interleaved memories so that 4 pixels can be read by FracDSRot in 1 clock cycle.

In any case, once ROIBuffer has been filled with normalized ROI information, it can be processed as in the example of FIG. 5 to produce the supplementary information which can be used by further processing modules 80.

It will be seen that in the approach of the second embodiment, a minimum of information can be read for a ROI from memory 40 as well as using fewer separate read operations than required by the first embodiment. However, at its maximum, the number of words which needs to be read for a line of the ROI from memory needs to contain $W_{ROI}/\cos(\Theta)$ pixels, where $W_{ROI}$ is the width of a ROI in pixels and Θ is the angular orientation of the ROI and this can increase the gate requirements for the normalisation module 70.

It will be appreciated from the above described embodiments, that while the normalization module 70 has been described as operating on a distortion corrected version 40-2 of an acquired image; the module could equally operate on an original image or filtered image 40-1.

Note that the information within ROIBuffer need not be written to the system memory 40. Instead, only the values or maps calculated by NORM based on the ROIBuffer information may be needed by other modules and so only this information might be written to memory 40 and/or transferred to other processing modules.

Indeed, the normalization module 70 could provide a front end of a larger processing module, for example, a face recognition module, which further processes the information provided by the normalization module front end before passing on its results.

In some implementations, Y_enh map could in fact overwrite the information in ROIBuffer, if memory space were at a premium and the unenhanced information were not needed by further processing modules.

The invention claimed is:

1. An image processing apparatus comprising a normalisation module operatively connected across a bus to a memory storing an image in which a region of interest (ROI) has been identified within the image, the ROI being bound by a rectangle having a non-orthogonal orientation within the image, the normalisation module being arranged to:
   divide said ROI into one or more slices, each slice comprising a plurality of adjacent rectangular tiles;
   for each slice, successively read ROI information for each tile from said memory including: reading a portion of said image extending across at least a width of said slice line-by-line along an extent of a slice;
   for each tile, downsample said ROI information to a buffer to within a scale $S_D$<2 of a required scale for a normalised version of said ROI; and fractionally down-sample and rotate downsampled information for a tile within said buffer to produce a respective normalised portion of the ROI at the required scale for the normalised ROI; and
   accumulate downsampled and rotated information for each tile within a normalised ROI buffer for subsequent processing by said image processing apparatus.

2. An image processing apparatus according to claim 1 wherein said ROI is divided into S slices and each slice is divided into T=S tiles.

3. An image processing apparatus according to claim 1 wherein said ROI is oriented at one of a fixed number of possible non-orthogonal orientations and the direction of reading successive slices and the order of reading successive tiles is a function of said orientation.

4. An image processing apparatus according to claim 3 wherein said fixed number is 8 and said orientations are evenly spaced from one another to detect objects at orientations within respective half-quadrant ranges of orientation.

5. An image processing apparatus according to claim 4 wherein successive tiles from ROI in adjacent half-quadrants are read in opposite directions.

6. An image processing apparatus according to claim 4 wherein successive slices from ROI in opposite hemispheres are read in opposite directions.

7. An image processing apparatus according to claim 3 wherein information for a slice is read from said memory beginning at a memory address corresponding to a leftmost pixel of a slice.

8. An image processing apparatus according to claim 1 wherein said portion of said image read from memory is constant for each line of a slice.

9. An image processing apparatus according to claim 8 wherein a start memory address for reading each line of a slice is advanced according to the non-orthogonal orientation of said ROI.

10. An image processing apparatus according to claim 8 wherein said advance is non-linear for a first tile of a slice.

11. An image processing apparatus according to claim 8 wherein said advance is linear for second and subsequent tiles of a slice.

12. An image processing apparatus comprising a normalisation module operatively connected across a bus to a memory storing an image in which a region of interest (ROI)

has been identified within the image, the ROI being bound by a rectangle having a non-orthogonal orientation within the image, the normalisation module being arranged to:

read ROI information from said memory including: reading a portion of said image extending across at least a width of said ROI line-by-line along an extent of the ROI;

for successive sets of lines of said ROI, downsample said ROI information to a buffer to within a scale $S_D<2$ of a required scale for a normalised version of said ROI;

for each set of lines, fractionally downsample and rotate downsampled information for the set of lines within said buffer to produce a respective normalised line of the ROI at the required scale for the normalised ROI; and accumulate downsampled and rotated lines within a normalised ROI buffer for subsequent processing by said image processing apparatus.

13. An image processing apparatus according to claim 12 wherein information for a line is read from said memory beginning at a start memory address corresponding to a leftmost pixel of a line and extending to an end memory address corresponding to a rightmost pixel of a line.

14. An image processing apparatus according to claim 12 wherein said apparatus is arranged to calculate a shift in said start memory address and said end memory address according to the non-orthogonal orientation of said ROI.

15. An image processing apparatus according to claim 14 wherein said apparatus is arranged to recalculate said shifts at any line incorporating a corner of said ROI.

16. An image processing apparatus according to claim 12 wherein a number of lines in said buffer into which said downsampled information is written is a function of the orientation of said ROI.

17. An image processing apparatus according to claim 1 wherein said apparatus is arranged to selectively flip information for said ROI according to said non-orthogonal orientation so that objects within said normalised ROI buffer have a common orientation.

18. An image processing apparatus according to claim 1 wherein said ROI of interest comprises a face detected within said image.

19. An image processing apparatus according to claim 1 wherein said apparatus is further arranged to perform one or both of histogram equalisation or contrast enhancement of the information within said normalised ROI buffer.

20. An image processing apparatus according to claim 1 wherein said apparatus is further arranged to determine a mean intensity value of the information within said normalised ROI buffer.

21. An image processing apparatus according to claim 1 wherein said apparatus is further arranged to generate one or more of the following maps based on the information within said normalised ROI buffer:

an Integral Image (II)

an $II^2$ map a Census map a LBP (linear binary pattern)

a HOG (Histogram of Gradients) and a Convolution of maps generated from a plurality of normalised ROI generated from respective images comprising similar content.

22. An image processing apparatus according to claim 1 wherein the normalisation module is responsive to the ROI being bound by a rectangle having an orthogonal orientation within the image to:

divide said ROI into one or more rectangular tiles; and for each tile, successively read ROI information for each tile from said memory including:

reading a portion of said image extending across at least a width of said tile; and downsampling information for a tile to produce a respective normalised portion of the ROI at the required scale for the normalised ROI; and accumulating downsampled information for each tile within a normalised ROI buffer for subsequent processing by said image processing apparatus.

\* \* \* \* \*